Aug. 16, 1932.　　　F. S. KINGSTON　　　1,872,595
ELECTRIC MOTOR
Filed July 25, 1929　　　2 Sheets-Sheet 1
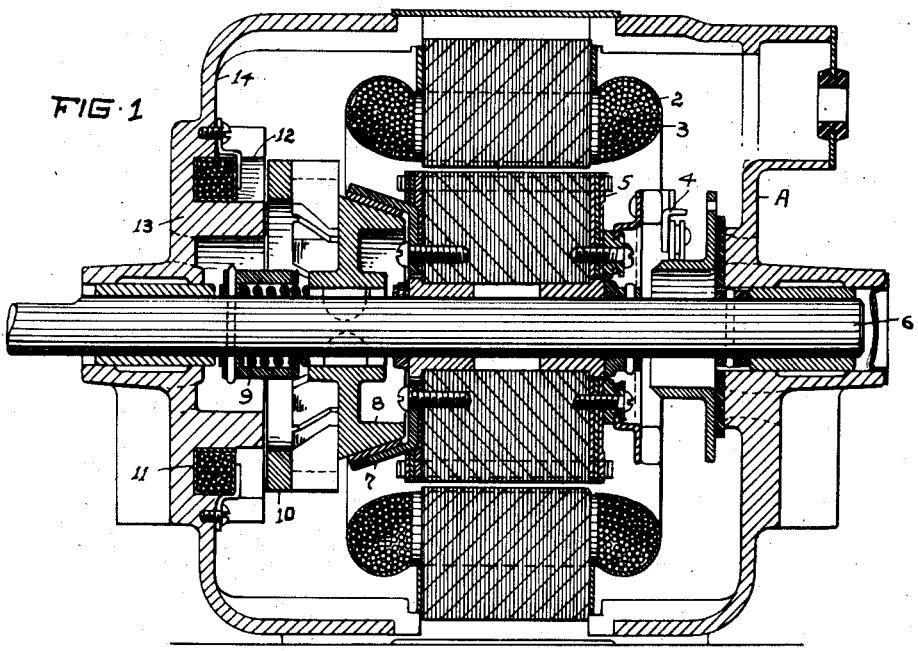
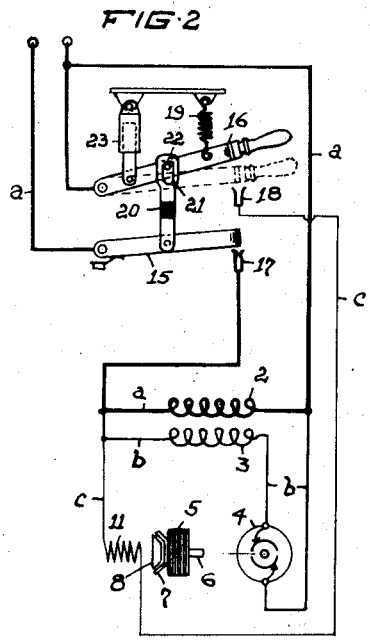
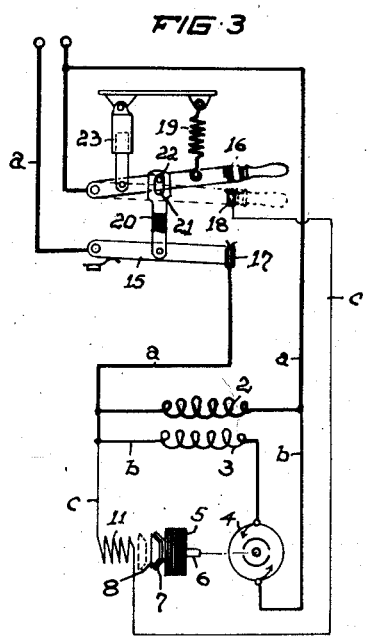
Inventor
F. S. KINGSTON
By Fisher, Moser & Moore.
Attorney Aug. 16, 1932.  F. S. KINGSTON  1,872,595
ELECTRIC MOTOR
Filed July 25, 1929   2 Sheets-Sheet 2

INVENTOR
F. S. KINGSTON.

Fisher, Moser & Moore
ATTORNEY

Patented Aug. 16, 1932

1,872,595

UNITED STATES PATENT OFFICE

FREDERICK S. KINGSTON, OF WARREN, OHIO, ASSIGNOR TO THE SUNLIGHT ELECTRICAL MANUFACTURING COMPANY, OF WARREN, OHIO, A CORPORATION OF OHIO

ELECTRIC MOTOR

Application filed July 25, 1929. Serial No. 380,874.

My invention relates to electric motors, and my object primarily is to provide an induction motor with auxiliary means whereby starting of the motor may be accomplished with a low inrush of current. Thus, the invention is especially applicable to split-phase motors of the type wherein a starting winding is controlled by a centrifugal switch, and in which the rotor is normally in clutch connection with the motor shaft and temporarily disconnected therefrom by electro-magnetic means when the starting winding is energized. In the present instance an auxiliary device is connected in the motor circuit whereby a motor constructed as described may be manually and automatically controlled, and starting effected with a low inrush of current and a high torque and the current switched off under objectionable overload.

Figure 4:
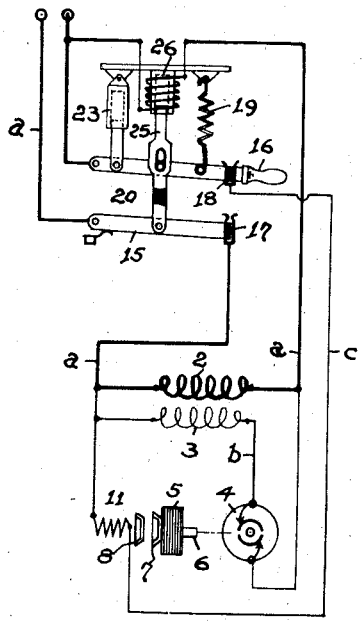
Figure 5:
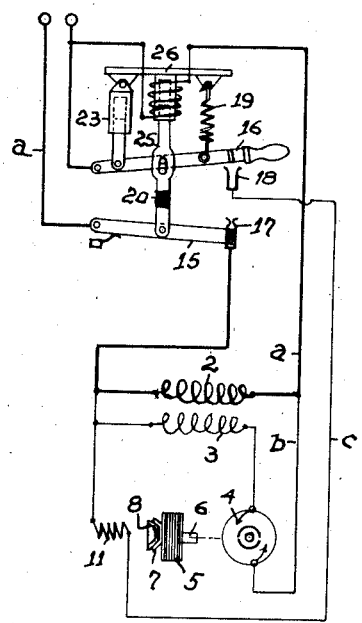
Figure 6:
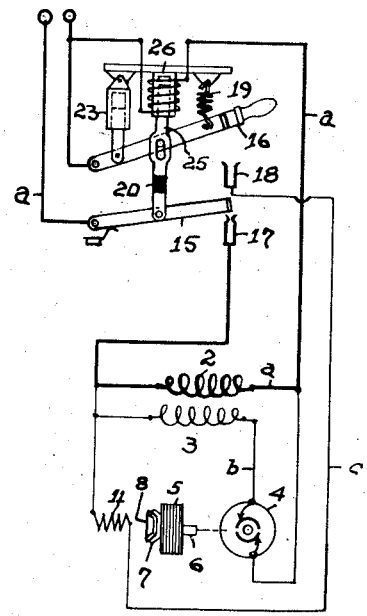

Referring first to the drawings, Fig. 1 is a sectional view of an electric motor embodying an electrically controlled clutch and a centrifugally controlled starting switch, and Figs. 2 and 3 are electrical diagrams representing the same motor and an electrical circuit therefor containing my improvements for controlling the starting and running operations of the motor. Figs. 4, 5, and 6, are diagrammatic views of a modified form of the invention, showing the controlling devices in the motor circuit in starting, running and stopping positions respectively.

As exemplified herein, the motor A is of the squirrel cage type having a main or running winding 2 connected across the power line, and a starting winding 3 connected in parallel with the main winding and controlled by a centrifugal switch 4 associated with the rotor 5, which in this instance is free to revolve independently on the power shaft 6 when not clutched thereto. Preferably, a friction clutch is employed within the motor itself, comprising a dished clutch member 7 fixed to one end of rotor 5, and a friction cone 8 keyed to slide on the shaft and held normally in clutching engagement with dished member 7 by a coiled compression spring 9. A ring armature 10 is secured rigidly to but apart from cone 8, opposite a coil or winding 11 seated within an annular groove 12 in an enlargement 13 in one metal hood 14 of the motor frame or casing. When coil 11 is energized the armature will be attracted and the clutch members will be released and held out of contact to permit the rotor to revolve freely on the motor shaft independently of the load. Such release is designed to occur instantly upon switching on the electric current to start the motor or coincidently with the energization of the main and starting windings 2 and 3, respectively.

The switching on of the current is effected manually, and as an exemplification of one form of switching means which may be used, see Figs. 2 and 3, which depict a pair of pivoted switch members or levers 15 and 16, and separate spring contacts 17 and 18, respectively, therefor. The two switch levers are also connected together but insulated from each other by a link 20 having a slotted part 21 in which a pin 22 on lever 16 is free to play within limits, thus permitting the two levers to be jointly operated but with a slight degree of relative movement between them. For example, the second lever 16 may be released from its contact 18 and still permit the main switch lever 15 to remain in engagement with the other contact 17. Moreover, contact 17 is provided with spring locking portions to prevent the opening of the main switch lever unless operated manually, whereas the auxiliary switch lever 16 is free to separate from its spring contact 18 under the pull of a tension spring 19. The opening movement of lever 16 is however under restraint or retarded until the motor is up to speed, and one way of accomplishing the desired result is by connecting the auxiliary switch lever to a dash pot 23. However, I do not limit myself to that specific device, as other means may be provided instead to check or withhold the breaking of circuit c and the de-energization of clutch coil 11 until centrifugal switch 4 cuts out the starting winding.

A double switch of the kind described functions as a main line switch and as a self-acting circuit breaker. Thus, in starting the motor the current is switched on from the line by depressing lever 16 until lever 15 is thrown into locking engagement with the forked contacts 17. In so doing lever 16 is also brought into engagement with its contact 18, thereby closing circuit c co-incidently or even slightly prior to the closing of circuits a and b, respectively. As a result the main and starting windings 2 and 3 and the clutch coil 11 are all energized, and the rotor comes up to speed quickly without load, inasmuch as the rotor is now un-clutched from the shaft. Lever 15 is now locked and held by the spring contact 17, and the tension spring 19 is exerting a pull on lever 16 to separate it from contact 18, assuming the operator has released lever 16. However, the dash pot 23 retards the opening movement of lever 16 long enough to permit the rotor to come up to speed and cause the centrifugal switch 4 to cut out the starting winding before circuit c is broken and the clutch thrown in. The load is therefore picked up at a high torque, and only a low input current used to start the motor. The motor then continues to run on its main winding 2 (see Fig. 3) until stopping of the motor is effected by unlocking lever 15 from the spring fingers 17. This is accomplished by manual uplift of lever 16 from the full line positions shown in Fig. 3 to the full line position shown in Fig. 2. The dotted position of lever 16 in Fig. 2 represents the idle movement of this lever relatively to lever 15.

In Figs. 4 to 6, inclusive, I show substantially the same circuits and devices hereinbefore described, like parts being marked the same, excepting that provision is made additionally to throw off the main switch automatically when the motor stalls or is overloaded. Thus, the connecting link 20 for the two switch members 15 and 16, is extended to provide a plunger or movable core 25 for a solenoid or electromagnet 26, the winding or coil of which is connected in series with the motor windings in the main circuit a of the motor. This solenoid is wound so that only excess or an additional amount of current flowing through the motor will cause it to release switch lever 15 when locked and while the motor is running. Thus, in event of an overload sufficient to slow down or stall the motor the additional current drawn from the line will kick off the main switch lever and stop the motor.

The specific clutch structure shown in Fig. 1 of the drawings is claimed in Kingston Patents No. 1,853,864 and No. 1,853,865 that issued on April 12, 1932 and is also specifically claimed in the copending application of Frederick S. Kingston, Serial No. 603,809, filed April 7, 1932.

What I claim, is:

1. A split phase induction motor, including a normally-engaged clutch, an electromagnet and circuit therefor for disengaging said clutch, in combination with a manually-operable switch for starting said motor said switch including an auxiliary self-opening and delayed acting switch for controlling said electromagnet circuit.

2. An induction motor, with automatically controlled splitphase starting devices, including a shaft, a rotor freely rotatable on said shaft, a clutch normally connecting the rotor and power transmitting shaft of the motor, and an electromagnet for releasing the clutch, in combination with a manually-operable switch for starting the motor and energizing said electromagnet, and an automatic delayed acting circuit breaker operatively connected with said switch for de-energizing said electromagnet after the motor has started.

3. A split phase induction motor including a rotor clutch normally connected to the motor shaft and electromagnetic means adapted to throw out the clutch, in combination with a manually-operable switch for control of the motor, having an auxiliary delayed acting self-opening switch for controlling said electromagnetic means.

4. An electric motor, comprising driving and driven means and a normally engaged clutch therefor, an electric circuit containing means for releasing said clutch, in combination with a manually-operable delayed acting self-opening switch for closing said circuit temporarily in starting operations.

5. A split phase electric motor, including a rotor and shaft and a clutch therefor, and an electromagnet and a circuit therefor for operating the clutch, in combination with a manually-operable self-opening switch for making and breaking the electromagnet circuit, and means for retarding the self-opening movements of said switch.

6. A split phase electric motor having a rotor and shaft provided with a normally-engaged clutch, and electrical means for disengaging said clutch upon switching on the starting current, in combination with a main switch for starting and stopping said motor said main switch including, a self-opening switch for controlling said electrical clutch disengaging means, and means for opening said main switch under overload.

7. A split phase electric motor having a freely revoluble rotor, a motor shaft, a clutch for said rotor and shaft, an electromagnet for releasing said clutch in starting operations, in combination with a manually-operable main switch including a self-opening auxiliary switch member for controlling the electromagnet, and an overload coil for throwing out said main switch.

8. An electric motor having a starting circuit, including a driven member, a clutch normally in driving connection with said member, an electric circuit containing means to throw out said clutch, in combination with a pair of connected switches operable manually to close the starting circuit and throw-out clutch circuit, and including means for opening of one of the switches automatically after it has been closed manually.

9. An induction motor, including a rotor, a stator, a driven element, a clutch for said rotor and driven element, and an electromagnet and winding to release said clutch, in combination with a pair of connected switches operable manually to start the motor and to energize the electromagnet windings, and means for effecting self-opening of one of said switches to de-energize said electromagnet after the switches have been manually closed.

In testimony whereof I affix my signature.

FREDERICK S. KINGSTON.